United States Patent
Onodera et al.

(10) Patent No.: US 11,335,505 B2
(45) Date of Patent: May 17, 2022

(54) ELECTRONIC COMPONENT

(71) Applicant: TDK CORPORATION, Tokyo (JP)

(72) Inventors: Shinya Onodera, Tokyo (JP); Takehisa Tamura, Tokyo (JP); Atsushi Takeda, Tokyo (JP); Yuichi Nagai, Tokyo (JP)

(73) Assignee: TDK CORPORATION, Tokyo (JP)

( * ) Notice: Subject to any disclaimer, the term of this patent is extended or adjusted under 35 U.S.C. 154(b) by 76 days.

(21) Appl. No.: 16/724,712

(22) Filed: Dec. 23, 2019

(65) Prior Publication Data

US 2020/0211775 A1 Jul. 2, 2020

(30) Foreign Application Priority Data

Dec. 27, 2018 (JP) .............................. JP2018-244483

(51) Int. Cl.
*H01G 4/248* (2006.01)
*H01G 4/30* (2006.01)
*H01G 4/012* (2006.01)

(52) U.S. Cl.
CPC ............. *H01G 4/248* (2013.01); *H01G 4/012* (2013.01); *H01G 4/30* (2013.01)

(58) Field of Classification Search
CPC ............ H01G 4/30; H01G 4/12; H01G 4/248; H01G 4/012; H01G 4/1209; H01G 4/232; H01G 4/0085; H01G 4/1227; H01G 4/2325

See application file for complete search history.

(56) References Cited

U.S. PATENT DOCUMENTS

| | | | |
|---|---|---|---|
| 9,775,232 B2* | 9/2017 | Park | H01G 2/065 |
| 9,875,849 B2* | 1/2018 | Lee | H01G 4/30 |
| 10,366,834 B1* | 7/2019 | Lee | H01G 4/30 |
| 2015/0022945 A1* | 1/2015 | Park | H01G 4/30 361/301.4 |
| 2015/0083475 A1* | 3/2015 | Kim | H01G 2/06 174/260 |
| 2015/0279562 A1* | 10/2015 | Nishisaka | H01G 4/2325 361/301.4 |
| 2017/0103853 A1* | 4/2017 | Zenzai | H01G 4/005 |
| 2017/0330689 A1* | 11/2017 | Hatanaka | H01G 4/30 |
| 2018/0166215 A1* | 6/2018 | Hamanaka | H01G 4/232 |
| 2018/0174753 A1* | 6/2018 | Terashita | H01G 4/232 |

FOREIGN PATENT DOCUMENTS

| | | |
|---|---|---|
| JP | H05-144665 A | 6/1993 |
| JP | 2005-159121 A | 6/2005 |
| JP | 2011-176187 A | 9/2011 |
| KR | 10-2015-0033392 A | 4/2015 |
| KR | 10-2017-0042481 A | 4/2017 |

* cited by examiner

*Primary Examiner* — Michael P McFadden
(74) *Attorney, Agent, or Firm* — Oliff PLC (57) ABSTRACT

An electronic component includes an element body and an external electrode disposed on the element body. The external electrode includes a conductive resin layer, a solder plating layer arranged to constitute an outermost layer of the external electrode, and an intermediate plating layer disposed between the conductive resin layer and the solder plating layer. The intermediate plating layer has better solder leach resistance than metal contained in the conductive resin layer. An opening is formed in the intermediate plating layer. The solder plating layer is formed on the conductive resin layer through the opening.

9 Claims, 7 Drawing Sheets

ELECTRONIC COMPONENT

BACKGROUND OF THE INVENTION

1. Field of the Invention

The present invention relates to an electronic component.

2. Description of Related Art

Known electronic components include an element body and an external electrode disposed on the element body (see, for example, Japanese Unexamined Patent Publication No. H05-144665). The external electrode includes a conductive resin layer disposed on the sintered metal layer, a solder plating layer arranged to constitute the outermost layer of the external electrode, and an intermediate plating layer disposed between the conductive resin layer and the solder plating layer. The intermediate plating layer has better solder leach resistance than metal contained in the conductive resin layer.

SUMMARY OF THE INVENTION

The conductive resin layer is generally formed on a base and contains a resin and conductive metal particles. The base includes, for example, a sintered metal layer or an element body. The resin tends to absorb moisture. In a case in which the electronic component is solder-mounted on an electronic device, the moisture absorbed by the resin may be gasified so that volume expansion may occur. In this case, stress may act on the conductive resin layer, and the conductive resin layer tends to be peeled off from the base. The electronic device includes, for example, a circuit board or an electronic component.

An object of one aspect of the present invention is to provide an electronic component that suppresses peel-off of a conductive resin layer.

An electronic component according to one aspect of the present invention includes an element body and an external electrode disposed on the element body. The external electrode includes a conductive resin layer, a solder plating layer arranged to constitute an outermost layer of the external electrode, and an intermediate plating layer disposed between the conductive resin layer and the solder plating layer. The intermediate plating layer has better solder leach resistance than metal contained in the conductive resin layer. An opening is formed in the intermediate plating layer. The solder plating layer is formed on the conductive resin layer through the opening.

In the one aspect, the external electrode includes the solder plating layer. Therefore, the one aspect can be solder-mounted on an electronic device. An intermediate plating layer suppresses the occurrence of solder leaching when the electronic component is solder-mounted.

When the electronic component is solder-mounted, the solder plating layer melts into the solder. Even in a case in which moisture absorbed in resin is gasified during solder-mounting, the gas generated from the moisture moves out of the external electrode through an opening from the conductive resin layer. Therefore, stress tends not to act on the conductive resin layer. Consequently, the one aspect suppresses peel-off of the conductive resin layer.

In the one aspect, an inner diameter of the opening may be 1 to 40 µm.

In a case in which the inner diameter of the opening is shorter than 1 µm, the gas generated from the moisture tends not to move inside the opening. In a case in which the inner diameter of the opening is longer than 40 µm, a region where the conductive resin layer is exposed from the intermediate plating layer tends to increase. The increase of the region where the conductive resin layer is exposed from the intermediate plating layer tends not to suppress the occurrence of solder leaching. Therefore, this configuration reliably suppresses the occurrence of solder leaching, and suppresses the inhibition of gas movement through the opening.

In the one aspect, the number of a plurality of the openings per 1 $mm^2$ may be 0.1 to 10.

In a case in which the number of the openings per 1 $mm^2$ is smaller than 0.1, the gas generated from the moisture tends not to move out of the external electrode. In a case in which the number of the openings per 1 $mm^2$ is larger than 10, a region where the conductive resin layer is exposed from the intermediate plating layer tends to increase. The increase of the region where the conductive resin layer is exposed from the intermediate plating layer tends not to suppress the occurrence of solder leaching. Therefore, this configuration reliably suppresses the occurrence of solder leaching, and suppresses the inhibition of gas movement through the opening.

In the one aspect, the opening may communicate with the inside of the conductive resin layer. In this case, the gas generated from the moisture in the conductive resin layer efficiently moves out of the external electrode. Therefore, stress further tends not to act on the conductive resin layer.

In the one aspect, the opening may communicate with a plurality of gaps existing in the conductive resin layer. In this case, the gas generated from the moisture in the conductive resin layer more efficiently moves out of the external electrode.

In the one aspect, the element body may have a rectangular parallelepiped shape, and may include a pair of end surface which opposing each other in a longitudinal direction of the element body, and a side surface adjacent to the pair of end surface. The conductive resin layer may include a first portion located on the end surface and a second portion located on the side surface. An existence ratio of gaps in the first portion may be larger than an existence ratio of gaps in the second portion.

In a case in which the gas generated from the moisture in the conductive resin layer moves out of the external electrode through the opening formed in a portion of the intermediate plating layer located on the second portion, a posture of the electronic component tends to change during solder-mounting due to ejection of the gas from the external electrode. In a case in which the posture of the electronic component changes, a mounting failure of the electronic component may occur.

In a case in which the existence ratio of gaps in the first portion is larger than the existence ratio of gaps in the second portion, the gas generated from the moisture in the conductive resin layer tends to moves out of the external electrode through the opening formed in a portion of the intermediate plating layer located on the first portion. That is, the gas tends not to moves from the opening formed in the portion of the intermediate plating layer located on the second portion. Therefore, in this configuration, the gas moves mainly through the opening formed in the portion of the intermediate plating layer located on the first portion. Consequently, this configuration suppresses the occurrence of the mounting failure of the electronic component.

An electronic component according to another aspect of the present invention includes an element body and an external electrode disposed on the element body. The external electrode includes a conductive resin layer, and a plating layer disposed on the conductive resin layer. An opening is formed in the plating layer. The conductive resin layer is exposed through the opening.

In the other aspect, even in a case in which moisture absorbed in resin is gasified during solder-mounting, the gas generated from the moisture moves out of the external electrode through an opening from the conductive resin layer. Therefore, stress tends not to act on the conductive resin layer. Consequently, the other aspect suppresses peel-off of the conductive resin layer.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

DETAILED DESCRIPTION OF EMBODIMENTS

Hereinafter, embodiments of the present invention will be described in detail with reference to the accompanying drawings. In the following description, the same elements or elements having the same functions are denoted with the same reference numerals and overlapped explanation is omitted.

Figure 1:
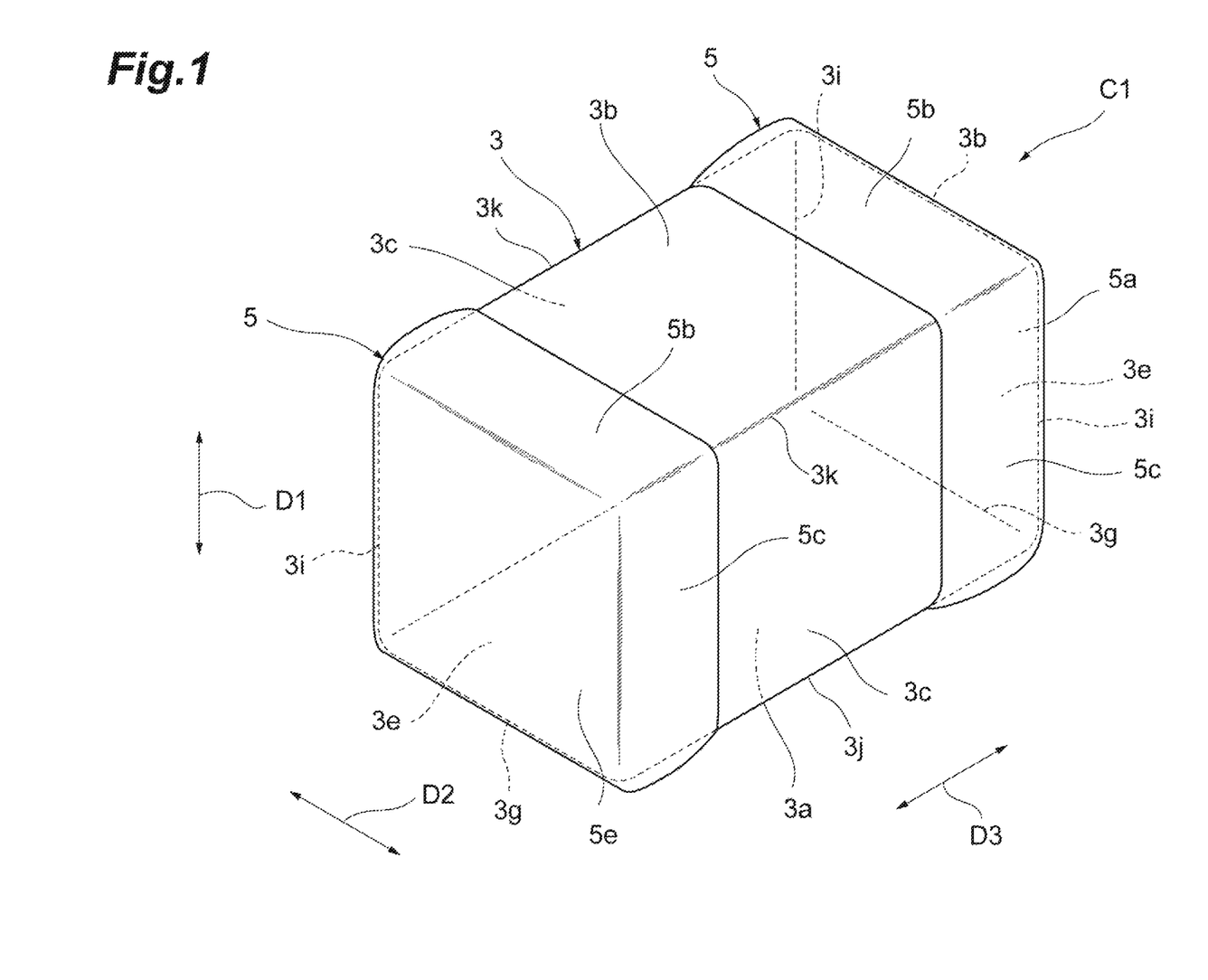
FIG. 1 is a perspective view of a multilayer capacitor according to an embodiment.
Figure 2:
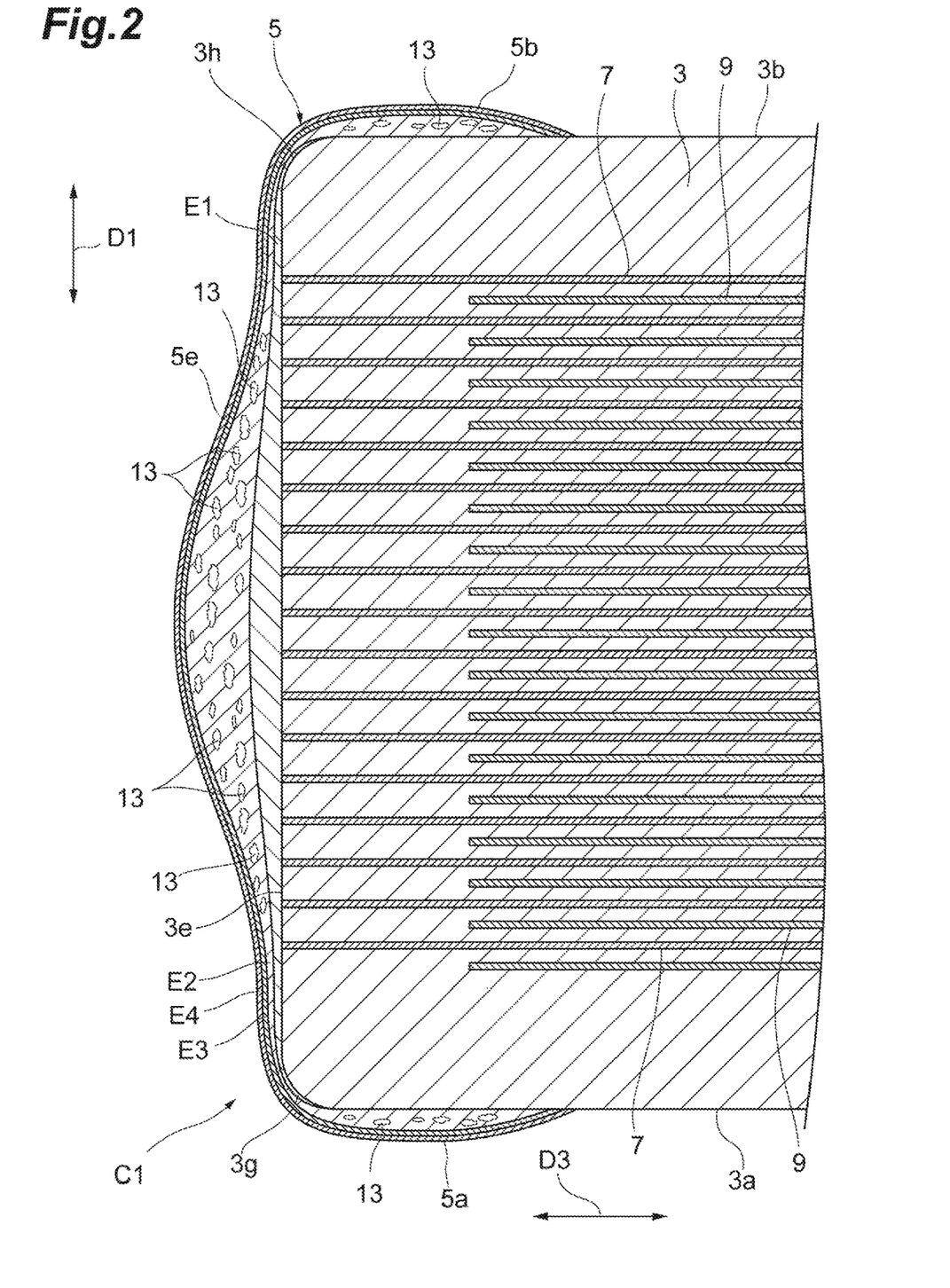
FIG. 2 is a view illustrating a cross-sectional configuration of the multilayer capacitor according to the embodiment.
Figure 3:
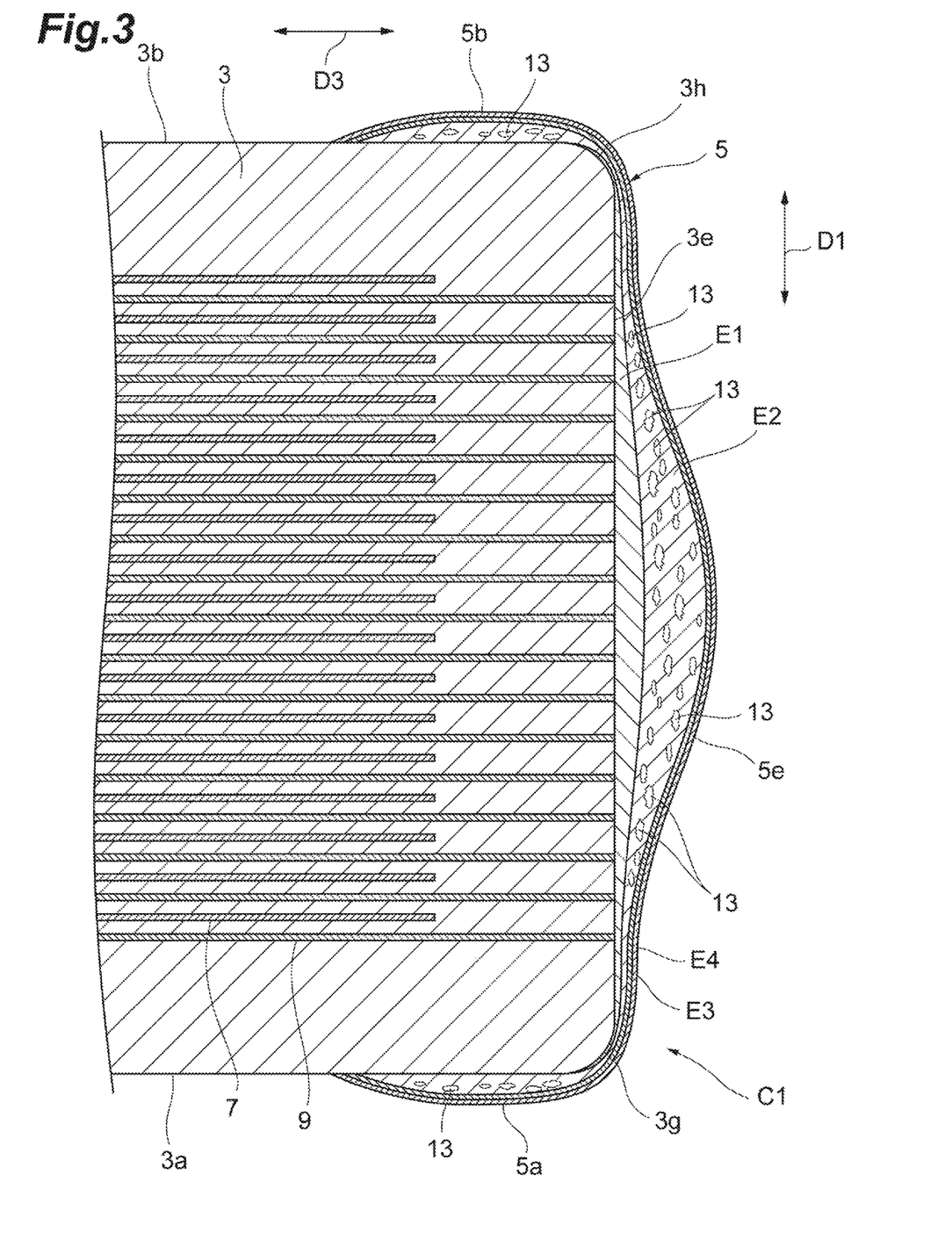
FIG. 3 is a view illustrating a cross-sectional configuration of the multilayer capacitor according to the embodiment.
Figure 4:
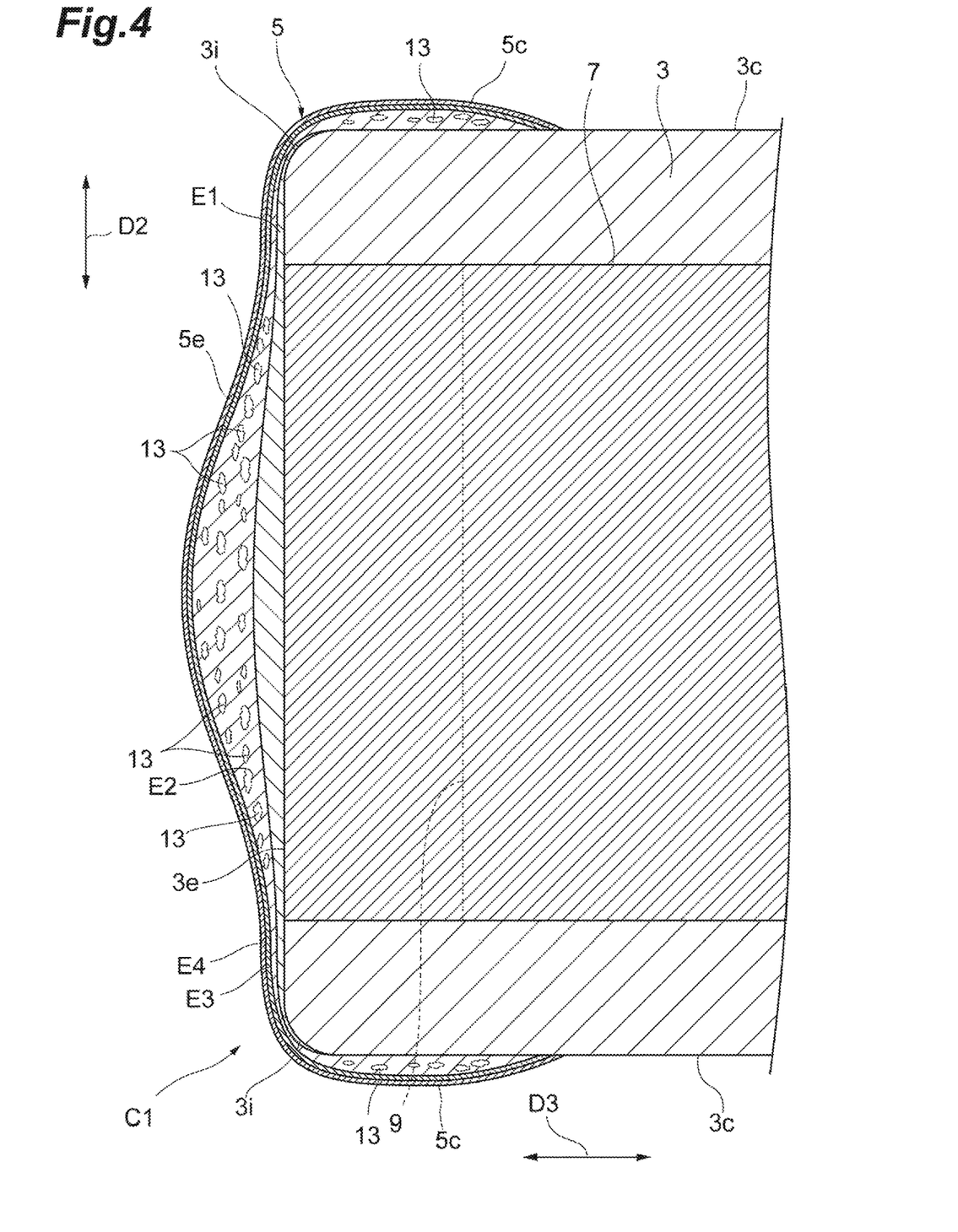
FIG. 4 is a view illustrating a cross-sectional configuration of the multilayer capacitor according to the embodiment.
Figure 5:
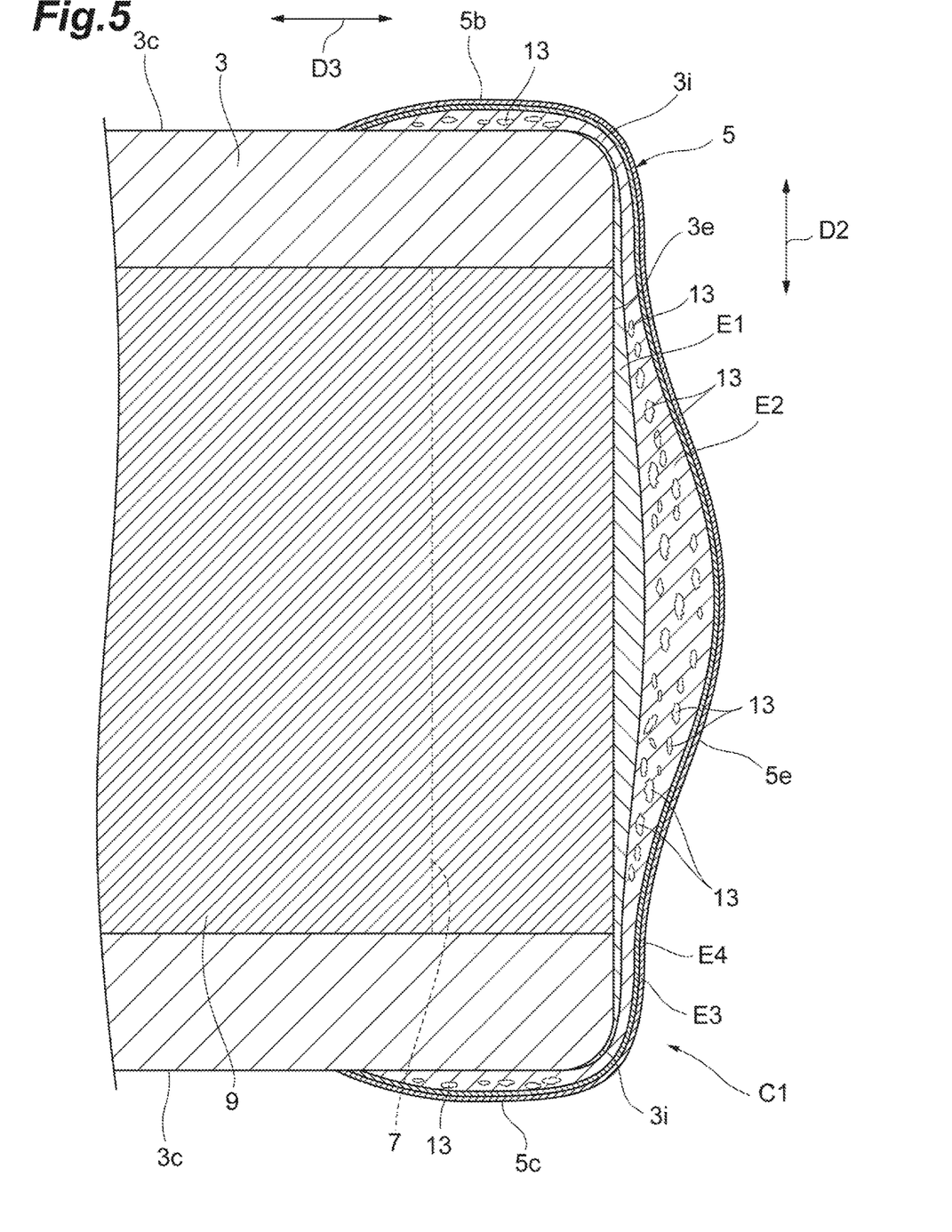
FIG. 5 is a view illustrating a cross-sectional configuration of the multilayer capacitor according to the embodiment.

A configuration of a multilayer capacitor C1 according to an embodiment will be described with reference to FIGS. 1 to 5. FIG. 1 is a perspective view of the multilayer capacitor according to the embodiment. FIGS. 2 to 5 are views illustrating a cross-sectional configuration of the multilayer capacitor according to the embodiment. In the present embodiment, an electronic component is, for example, the multilayer capacitor C1.

As illustrated in FIG. 1, the multilayer capacitor C1 includes an element body 3 of a rectangular parallelepiped shape and a plurality of external electrodes 5. In the present embodiment, the multilayer capacitor C1 includes a pair of external electrodes 5. The pair of external electrodes 5 is disposed on an outer surface of the element body 3. The pair of external electrodes 5 is separated from each other. The rectangular parallelepiped shape includes a rectangular parallelepiped shape in which corners and ridges are chamfered, and a rectangular parallelepiped shape in which the corners and ridges are rounded.

The element body 3 includes a pair of principal surfaces 3a and 3b opposing each other, a pair of side surfaces 3c opposing each other, and a pair of end surfaces 3e opposing each other. The pair of principal surfaces 3a and 3b, the pair of side surfaces 3c, and the pair of end surfaces 3e have a rectangular shape. The direction in which the pair of principal surfaces 3a and 3b opposes each other is a first direction D1. The direction in which the pair of side surfaces 3c opposes each other is a second direction D2. The direction in which the pair of end surfaces 3e opposes each other is a third direction D3. The multilayer capacitor C1 is solder-mounted on an electronic device. The electronic device includes, for example, a circuit board or an electronic component. The principal surface 3a of the multilayer capacitor C1 opposes the electronic device. The principal surface 3a is arranged to constitute a mounting surface. The principal surface 3a is the mounting surface. The principal surface 3b may be arranged to constitute the mounting surface. In a case in which, the principal surface 3b is the mounting surface.

The first direction D1 is a direction orthogonal to the respective principal surfaces 3a and 3b and is orthogonal to the second direction D2. The third direction D3 is a direction parallel to the respective principal surfaces 3a and 3b and the respective side surfaces 3c, and is orthogonal to the first direction D1 and the second direction D2. The second direction D2 is a direction orthogonal to the respective side surfaces 3c. The third direction D3 is a direction orthogonal to the respective end surfaces 3e. In the present embodiment, a length of the element body 3 in the third direction D3 is larger than a length of the element body 3 in the first direction D1, and larger than a length of the element body 3 in the second direction D2. The third direction D3 is a longitudinal direction of the element body 3. The length of the element body 3 in the first direction D1 and the length of the element body 3 in the second direction D2 may be equivalent to each other. The length of the element body 3 in the first direction D1 and the length of the element body 3 in the second direction D2 may be different from each other.

The pair of side surfaces 3c extends in the first direction D1 to couple the pair of principal surfaces 3a and 3b. The pair of side surfaces 3c also extends in the third direction D3. The pair of end surfaces 3e extends in the first direction D1 to couple the pair of principal surfaces 3a and 3b. The pair of end surfaces 3e extends in the second direction D2.

The element body 3 includes a pair of ridge portions 3g, a pair of ridge portions 3h, four ridge portions 3i, a pair of ridge portions 3j, and a pair of ridge portions 3k. The ridge portion 3g is positioned between the end surface 3e and the principal surface 3a. The ridge portion 3h is positioned between the end surface 3e and the principal surface 3b. The ridge portion 3i is positioned between the end surface 3e and the side surface 3c. The ridge portion 3j is positioned between the principal surface 3a and the side surface 3c. The ridge portion 3k is positioned between the principal surface 3b and the side surface 3c. In the present embodiment, each of the ridge portions 3g, 3h, 3i, 3j, and 3k is rounded to curve. The element body 3 is subject to what is called a round chamfering process.

The end surface 3e and the principal surface 3a are indirectly adjacent to each other with the ridge portion 3g between the end surface 3e and the principal surface 3a. The end surface 3e and the principal surface 3b are indirectly adjacent to each other with the ridge portion 3h between the end surface 3e and the principal surface 3b. The end surface 3e and the side surface 3c are indirectly adjacent to each other with the ridge portion 3i between the end surface 3e and the side surface 3c. The principal surface 3a and the side surface 3c are indirectly adjacent to each other with the ridge portion 3j between the principal surface 3a and the side surface 3c. The principal surface 3b and the side surface 3c are indirectly adjacent to each other with the ridge portion 3k between the principal surface 3b and the side surface 3c.

The element body 3 is configured by laminating a plurality of dielectric layers in the first direction D1. The element body 3 includes the plurality of laminated dielectric layers. In the element body 3, a lamination direction of the plurality of dielectric layers coincides with the first direction D1. Each dielectric layer includes, for example, a sintered body of a ceramic green sheet containing a dielectric material. The dielectric material includes, for example, a dielectric ceramic of $BaTiO_3$ base, $Ba(Ti,Zr)O_3$ base, or $(Ba,Ca)TiO_3$ base. In an actual element body 3, each of the dielectric layers is integrated to such an extent that a boundary between the dielectric layers cannot be visually recognized. In the element body 3, the lamination direction of the plurality of dielectric layers may coincide with the second direction D2.

As illustrated in FIGS. 2 to 5, the multilayer capacitor C1 includes a plurality of internal electrodes 7 and a plurality of internal electrodes 9. Each of the internal electrodes 7 and 9 is an internal conductor disposed in the element body 3. Each of the internal electrodes 7 and 9 is made of a conductive material that is commonly used as an internal conductor of a multilayer, electronic component. The conductive material includes, for example, a base metal. The conductive material includes, for example, Ni or Cu. Each of the internal electrodes 7 and 9 is configured as a sintered body of conductive paste containing the conductive material described above. In the present embodiment, the internal electrodes 7 and 9 are made of Ni.

The internal electrodes 7 and the internal electrodes 9 are disposed in different positions (layers) in the first direction D1. The internal electrodes 7 and the internal electrodes 9 are alternately disposed in the element body 3 to oppose each other in the first direction D1 with an interval therebetween. Polarities of the internal electrodes 7 and the internal electrodes 9 are different from each other. In a case in which the lamination direction of the plurality of dielectric layers is the second direction D2, the internal electrodes 7 and the internal electrodes 9 are disposed in different positions (layers) in the second direction D2. One end of each of the internal electrodes 7 and 9 is exposed to a corresponding end surface 3e of the pair of the end surfaces 3e. Each of the internal electrodes 7 and 9 includes the one end exposed to the corresponding end surface 3e.

The plurality of internal electrodes 7 and the plurality of internal electrodes 9 are alternately disposed in the first direction D1. The internal electrodes 7 and 9 are positioned in a plane approximately parallel to the principal surfaces 3a and 3b. The internal electrodes 7 and the internal electrodes 9 oppose each other in the first direction D1. The direction (first direction D1) in which the internal electrodes 7 and the internal electrodes 9 oppose each other is orthogonal to the direction (second direction D2 and third direction D3) parallel to the principal surfaces 3a and 3b. In a case in which the lamination direction of the plurality of dielectric layers is the second direction D2, the plurality of internal electrodes 7 and the plurality of internal electrodes 9 are alternately disposed in the second direction D2. In this case, the internal electrodes 7 and 9 are positioned in a plane approximately orthogonal to the principal surfaces 3a and 3b. The internal electrodes 7 and the internal electrodes 9 oppose each other in the second direction D2.

As illustrated in FIG. 1, the external electrodes 5 are disposed at both end portions of the element body 3 in the third direction D3. Each of the external electrodes 5 is disposed on the corresponding end surface 3e side of the element body 3. As illustrated in FIGS. 2 to 5, the external electrode 5 includes a plurality of electrode portions 5a, 5b, 5c, and 5e. The electrode portion 5a is disposed on the principal surface 3a and the ridge portion 3g. The electrode portion 5b is disposed on the principal surface 3b and the ridge portion 3h. The electrode portion 5c is disposed on each side surface 3c and each ridge portion 3i. The electrode portion 5e is disposed on the corresponding end surface 3e. The external electrode 5 also includes electrode portions disposed on the ridge portions 3j. Each of the external electrodes 5 is disposed on at least the end surface 3e.

The external electrode 5 is formed on the five surfaces, that is, the pair of principal surfaces 3a and 3b, the end surface 3e, and the pair of side surfaces 3c, as well as on the ridge portions 3g, 3h, 3i, and 3j. The electrode portions 5a, 5b, 5c, and 5e adjacent each other are coupled and are electrically connected to each other. Each electrode portion 5e covers all the one ends of the corresponding internal electrodes 7 or 9. The electrode portion 5e is directly connected to the corresponding internal electrodes 7 or 9. The external electrode 5 is electrically connected to the corresponding internal electrodes 7 or 9. As illustrated in FIGS. 2 to 5, the external electrode 5 includes a first electrode layer E1, a second electrode layer E2, a third electrode layer E3, and a fourth electrode layer E4. The fourth electrode layer E4 is arranged to constitute the outermost layer of the external electrode 5. Each of the electrode portions 5a, 5b, 5c, and 5e includes the first electrode layer E1, the second electrode layer E2, the third electrode layer E3, and the fourth electrode layer E4.

The first electrode layer E1 included in the electrode portion 5a is disposed on the ridge portion 3g, and is not disposed on the principal surface 3a. The first electrode layer E1 included in the electrode portion 5a is formed to cover the entire ridge portion 3g. The first electrode layer E1 is not formed on the principal surface 3a. The first electrode layer E1 included in the electrode portion 5a is in contact with the entire ridge portion 3g. The principal surface 3a is not covered with the first electrode layer E1, and is exposed from the first electrode layer E1. The first electrode layer E1 included in the electrode portion 5a may be disposed on the principal surface 3a. In this case, the first electrode layer E1 included in the electrode portion 5a is formed to cover one part of the principal surface 3a and the entire ridge portion 3g. That is, the first electrode layer E1 included in the electrode portion 5a is also in contact with the one part of the principal surface 3a. The one part of the principal surface 3a is, for example, the partial region near the end surface 3e, in the principal surface 3a.

The second electrode layer E2 included in the electrode portion 5a is disposed on the first electrode layer E1 and on the principal surface 3a. In the electrode portion 5a, the second electrode layer E2 covers the entire first electrode layer E1. In the electrode portion 5a, the second electrode layer E2 is in contact with the entire first electrode layer E1.

The second electrode layer E2 included in the electrode portion 5a is in contact with one part of the principal surface 3a. The one part of the principal surface 3a is, for example, the partial region near the end surface 3e, in the principal surface 3a. That is, the one part of the principal surface 3a is close to the end surface 3e. The electrode portion 5a is four-layered on the ridge portion 3g, and is three-layered on the principal surface 3a. The second electrode layer E2 included in the electrode portion 5a is formed to cover the one part of the principal surface 3a and the entire ridge portion 3g. As described above, the one part of the principal surface 3a is, for example, the partial region near the end surface 3e, in the principal surface 3a. The second electrode layer E2 included in the electrode portion 5a indirectly covers the entire ridge portion 3g in such a manner that the first electrode layer E1 is positioned between the second electrode layer E2 and the element body 3. The second electrode layer E2 included in the electrode portion 5a directly covers the one part of the principal surface 3a. The second electrode layer E2 included in the electrode portion 5a directly covers an entire portion of the first electrode layer E1 formed on the ridge portion 3g. In a case in which the first electrode layer E1 included in the electrode portion 5a is disposed on the principal surface 3a, the electrode portion 5a is four-layered on the principal surface 3a and the ridge portion 3g.

The first electrode layer E1 included in the electrode portion 5b is disposed on the ridge portion 3h, and is not disposed on the principal surface 3b. The first electrode layer E1 included in the electrode portion 5b is formed to cover the entire ridge portion 3h. The first electrode layer E1 is not formed on the principal surface 3b. The first electrode layer E1 included in the electrode portion 5b is in contact with the entire ridge portion 3h. The principal surface 3b is not covered with the first electrode layer E1, and is exposed from the first electrode layer E1. The first electrode layer E1 included in the electrode portion 5b may be disposed on the principal surface 3b. In this case, the first electrode layer E1 included in the electrode portion 5b is formed to cover one part of the principal surface 3b and the entire ridge portion 3h. That is, the first electrode layer E1 included in the electrode portion 5b is also in contact with the one part of the principal surface 3b. The one part of the principal surface 3b is, for example, the partial region near the end surface 3e, in the principal surface 3b.

The second electrode layer E2 included in the electrode portion 5b is disposed on the first electrode layer E1 and on the principal surface 3b. In the electrode portion 5b, the second electrode layer E2 covers the entire first electrode layer E1. In the electrode portion 5b, the second electrode layer E2 is in contact with the entire first electrode layer E1. The second electrode layer E2 included in the electrode portion 5b is in contact with one part of the principal surface 3b. The one part of the principal surface 3b is, for example, the partial region near the end surface 3e, in the principal surface 3b. That is, the one part of the principal surface 3b is close to the end surface 3e. The electrode portion 5b is four-layered on the ridge portion 3h, and is three-layered on the principal surface 3b. The second electrode layer E2 included in the electrode portion 5b is formed to cover the one part of the principal surface 3b and the entire ridge portion 3h. As described above, the one part of the principal surface 3b is, for example, the partial region near the end surface 3e, in the principal surface 3b. The second electrode layer E2 included in the electrode portion 5b indirectly covers the entire ridge portion 3h in such a manner that the first electrode layer E1 is positioned between the second electrode layer E2 and the element body 3. The second electrode layer E2 included in the electrode portion 5b directly covers the one part of the principal surface 3b. The second electrode layer E2 included in the electrode portion 5b directly covers an entire portion of the first electrode layer E1 formed on the ridge portion 3h. In a case in which the first electrode layer E1 included in the electrode portion 5b is disposed on the principal surface 3b, the electrode portion 5b is four-layered on the principal surface 3b and the ridge portion 3h.

The first electrode layer E1 included in the electrode portion 5c is disposed on the ridge portion 3i, and is not disposed on the side surface 3c. The first electrode layer E1 included in the electrode portion 5c is formed to cover the entire ridge portion 3i. The first electrode layer E1 is not formed on the side surface 3c. The first electrode layer E1 included in the electrode portion 5c is in contact with the entire ridge portion 3i. The side surface 3c is not covered with the first electrode layer E1, and is exposed from the first electrode layer E1. The first electrode layer E1 included in the electrode portion 5c may be disposed on the side surface 3c. In this case, the first electrode layer E1 included in the electrode portion 5c is formed to cover one part of the side surface 3c and the entire ridge portion 3i. That is, the first electrode layer E1 included in the electrode portion 5c is also in contact with the one part of the side surface 3c. The one part of the side surface 3c is, for example, the partial region near the end surface 3e, in the side surface 3c.

The second electrode layer E2 included in the electrode portion 5c is disposed on the first electrode layer E1 and on the side surface 3c. In the electrode portion 5c, the second electrode layer E2 covers the entire first electrode layer E1. In the electrode portion 5c, the second electrode layer E2 is in contact with the entire first electrode layer E1. The second electrode layer E2 included in the electrode portion 5c is in contact with one part of the side surface 3c. The one part of the side surface 3c is, for example, the partial region near the end surface 3e, in the side surface 3c. That is, the one part of the side surface 3c is close to the end surface 3e. The electrode portion 5c is four-layered on the ridge portion 3i, and is three-layered on the side surface 3c. The second electrode layer E2 included in the electrode portion 5c is formed to cover the one part of the side surface 3c and the entire ridge portion 3i. As described above, the one part of the side surface 3c is, for example, the partial region near the end surface 3e, in the side surface 3e. The second electrode layer E2 included in the electrode portion 5c indirectly covers the entire ridge portion 3i in such a manner that the first electrode layer E1 is positioned between the second electrode layer E2 and the element body 3. The second electrode layer E2 included in the electrode portion 5c directly covers the one part of the side surface 3c. The second electrode layer E2 included in the electrode portion 5c directly covers an entire portion of the first electrode layer E1 formed on the ridge portion 3i. In a case in which the first electrode layer E1 included in the electrode portion 5c is disposed on the side surface 3c, the electrode portion 5c is four-layered on the side surface 3c and the ridge portion 3i.

The second electrode layer E2 included in the electrode portion 5c may be formed to cover one part of the ridge portion 3i and one part of the side surface 3c. The one part of the ridge portion 3i is, for example, the partial region near the principal surface 3a, in the ridge portion 3i. That is, the one part of the ridge portion 3i is close to the principal surface 3a. The one part of the side surface 3c is, for example, the corner region near the principal surface 3a and end surface 3e, in the side surface 3c. That is, the one part of the side surface 3c is close to the principal surface 3a and end surface 3e. In this case, the second electrode layer E2 included in the electrode portion 5c indirectly covers the one part of the ridge portion 3i in such a manner that the first electrode layer E1 is positioned between the second electrode layer E2 and the ridge portion 3i. The second electrode layer E2 included in the electrode portion 5c directly covers the one part of the side surface 3c. The second electrode layer E2 included in the electrode portion 5c directly covers a part of the portion of the first electrode layer E1 formed on the ridge portion 3i. The electrode portion 5c includes a region where the first electrode layer E1 is exposed from the second electrode layer E2, and a region where the first electrode layer E1 is covered with the second electrode layer E2. In a case in which the second electrode layer E2 included in the electrode portion 5c is formed to cover the one part of the ridge portion 3i and the one part of the side surface 3c, as described above, the internal electrodes 7 and the internal electrodes 9 may be disposed in different positions (layers) in the second direction D2.

The first electrode layer E1 included in the electrode portion 5e is disposed on the end surface 3e. The end surface 3e is entirely covered with the first electrode layer E1. The first electrode layer E1 included in the electrode portion 5e is in contact with the entire end surface 3e. The second electrode layer E2 included in the electrode portion 5e is disposed on the first electrode layer E1. In the electrode portion 5e, the second electrode layer E2 is in contact with the entire first electrode layer E1. The second electrode layer E2 included in the electrode portion 5e is formed to cover the entire end surface 3e. The second electrode layer E2 included in the electrode portion 5e indirectly covers the entire end surface 3e in such a manner that the first electrode layer E1 is positioned between the second electrode layer E2 and the end surface 3e. The second electrode layer E2 included in the electrode portion 5e directly covers the entire first electrode layer E1. In the electrode portion 5e, the first electrode layer E1 is formed on the end surface 3e to be coupled to the one ends of the corresponding internal electrodes 7 or 9.

The second electrode layer E2 included in the electrode portion 5e may be formed to cover one part of the end surface 3e. The one part of the end surface 3e is, for example, the partial region near the principal surface 3a, in the end surface 3e. That is, the one part of the end surface 3e is close to the principal surface 3a. In this case, the second electrode layer E2 included in the electrode portion 5e indirectly covers the one part of the end surface 3e in such a manner that the first electrode layer E1 is positioned between the second electrode layer E2 and the end surface 3e. The second electrode layer E2 included in the electrode portion 5e directly covers one part of the first electrode layer E1 formed on the end surface 3e. The electrode portion 5e includes a region where the first electrode layer E1 is exposed from the second electrode layer E2, and a region where the first electrode layer E1 is covered with the second electrode layer E2. In a case in which the second electrode layer E2 included in the electrode portion 5e is formed to cover the one part of the end surface 3e, as described above, the internal electrodes 7 and the internal electrodes 9 may be disposed in different positions (layers) in the second direction D2.

The first electrode layer E1 is formed by sintering conductive paste applied onto the surface of the element body 3. The first electrode layer E1 is formed to cover the end surface 3e and the ridge portions 3g, 3h, 3i and 3j. The first electrode layer E1 is formed by sintering a metal component (metal powder) contained in the conductive paste. The first electrode layer E1 includes a sintered metal layer. The first electrode layer E1 includes a sintered metal layer formed on the element body 3. In the present embodiment, the first electrode layer E1 is a sintered metal layer made of Cu. The first electrode layer E1 may be a sintered metal layer made of Ni. The first electrode layer E1 contains a base metal. The conductive paste contains, for example, powder made of Cu or Ni, a glass component, an organic binder, and an organic solvent. The first electrode layer E1 included in the electrode portion 5a, the first electrode layer E1 included in the electrode portion 5b, the first electrode layer E1 included in the electrode portion 5c, and the first electrode layer E1 included in the electrode portion 5e are integrally formed.

The second electrode layer E2 is formed by curing conductive resin paste applied onto the first electrode layer E1. The second electrode layer E2 is formed over the first electrode layer E1 and the element body 3. The first electrode layer E1 serves as an underlying metal layer for forming the second electrode layer E2. The second electrode layer E2 is a conductive resin layer that covers the first electrode layer E1. The conductive resin paste contains, for example, a resin, a conductive material, and an organic solvent. The resin is, for example, a thermosetting resin. The conductive material includes, for example, metal powder. The metal powder includes, for example, Ag powder or Cu powder. The thermosetting resin includes, for example, a phenolic resin, an acrylic resin, a silicone resin, an epoxy resin, or a polyimide resin. The second electrode layer E2 is in contact with a partial region of the ridge portion 3j. The second electrode layer E2 included in the electrode portion 5a, the second electrode layer E2 included in the electrode portion 5b, the second electrode layer E2 included in the electrode portion 5c, and the second electrode layer E2 included in the electrode portion 5e are integrally formed.

The third electrode layer E3 is formed on the second electrode layer E2 by plating method. In the present embodiment, the third electrode layer E3 is formed on the second electrode layer E2 by Ni plating. The third electrode layer E3 is a Ni plating layer. The third electrode layer E3 contains Ni. The third electrode layer E3 has better solder leach resistance than the metal contained in the second electrode layer E2.

The fourth electrode layer E4 is formed on the third electrode layer E3 by plating method. The fourth electrode layer E4 includes a solder plating layer. In the present embodiment, the fourth electrode layer E4 is formed on the third electrode layer E3 by Sn plating. The fourth electrode layer E4 is an Sn plating layer. The fourth electrode layer E4 may be an Sn—Ag alloy plating layer, an Sn—Bi alloy plating layer, or an Sn—Cu alloy plating layer. The fourth electrode layer E4 contains Sn, Sn—Ag alloy, Sn—Bi alloy, or Sn—Cu alloy.

The third electrode layer E3 and the fourth electrode layer E4 constitute a plating layer formed on the second electrode layer E2. In the present embodiment, the plating layer formed on the second electrode layer E2 is two-layered. The third electrode layer E3 is an intermediate plating layer positioned between the fourth electrode layer E4 arranged to constitute the outermost layer and the second electrode layer E2. The third electrode layer E3 included in the electrode portion 5a, the third electrode layer E3 included in the electrode portion 5b, the third electrode layer E3 included in the electrode portion 5c, and the third electrode layer E3 included in the electrode portion 5e are integrally formed. The fourth electrode layer E4 included in the electrode portion 5a, the fourth electrode layer E4 included in the electrode portion 5b, the fourth electrode layer E4 included in the electrode portion 5c, and the fourth electrode layer E4 included in the electrode portion 5e are integrally formed.

Figure 6:
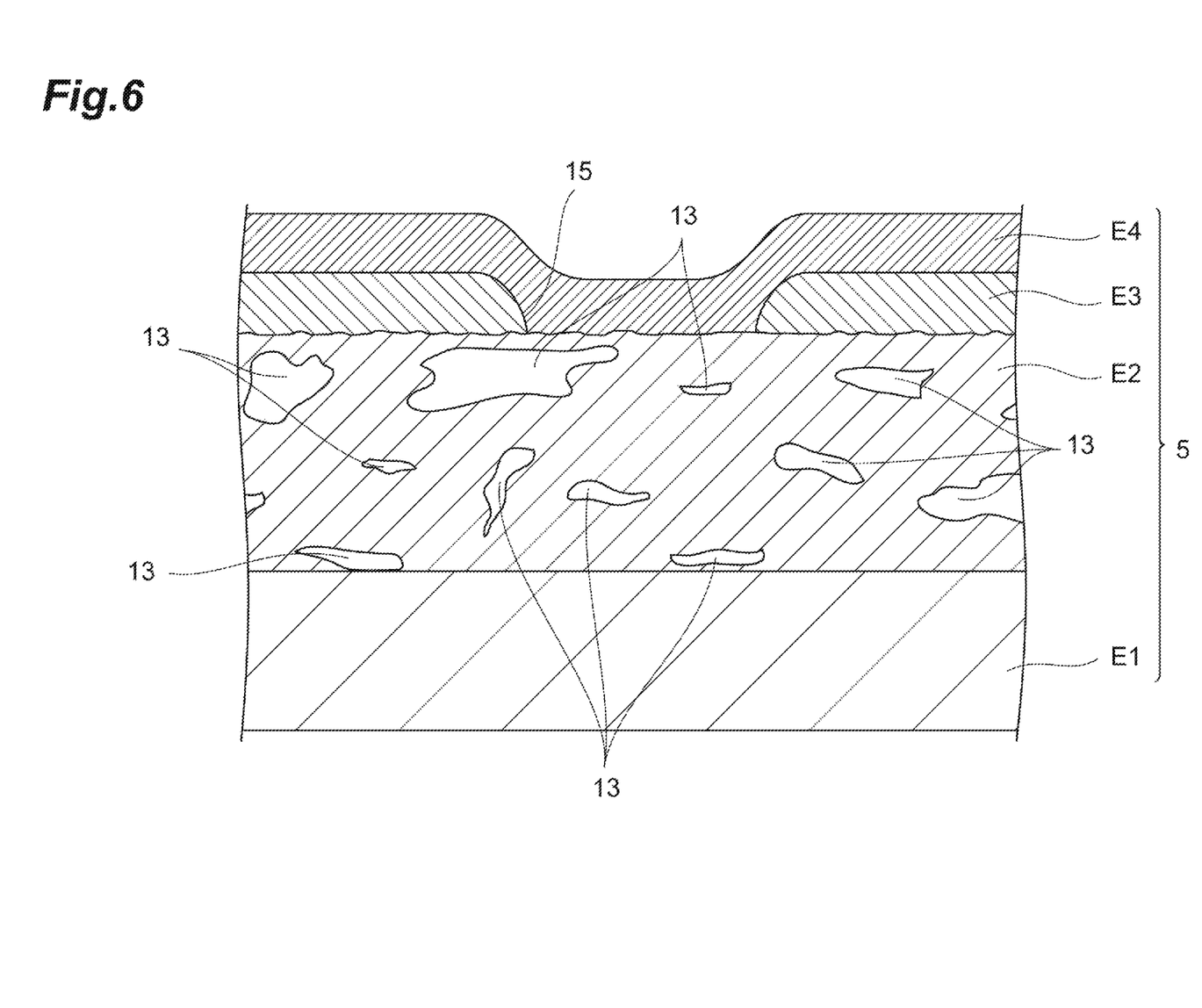
FIG. 6 is a view illustrating a cross-sectional configuration of an external electrode.
Figure 7:
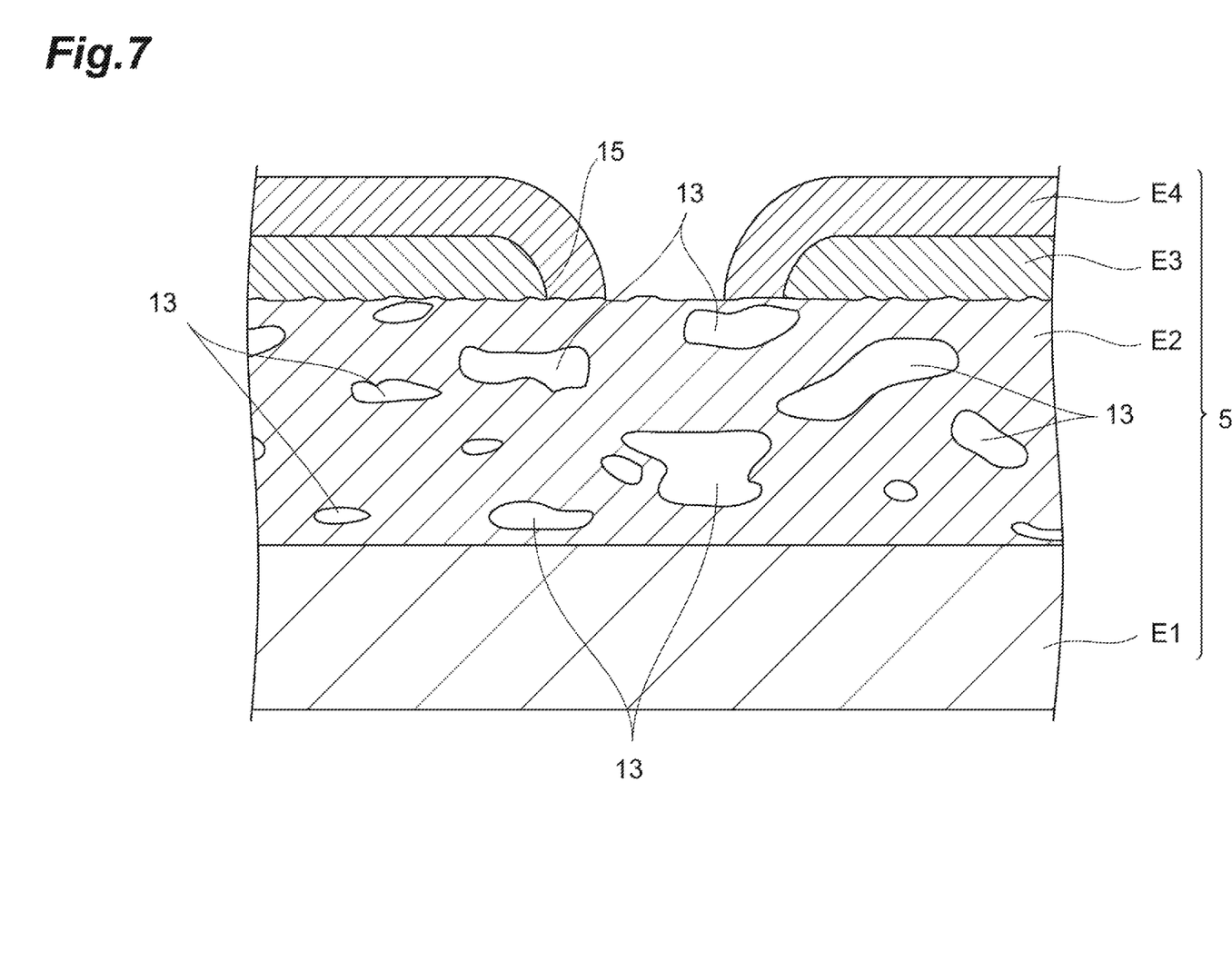
FIG. 7 is a view illustrating a cross-sectional configuration of an external electrode.

As illustrated in FIGS. 2 to 7, a plurality of gaps 13 exists in the second electrode layer E2. The plurality of gaps 13 is dispersed in the second electrode layer E2. Some gaps 13 of the plurality of gaps 13 communicate with each other. The gaps 13 communicating with each other form at least one passage. The passage formed by the gaps 13 communicating with each other is open at the surface of the second electrode layer E2. In the cross-section along a thickness direction of the second electrode layer E2, a maximum length of the gap 13 is in the range of 1 to 20 μm. In the present embodiment, the maximum length of the gap 13 is 20 μm. FIGS. 6 and 7 are views illustrating a cross-sectional configuration of the external electrode.

As described above, the second electrode layer E2 includes a portion included in the electrode portion 5e and a portion included in the electrode portion 5c. That is, the second electrode layer E2 included in the electrode portion 5e is located on the end surface 3e, and the second electrode layer E2 included in the electrode portion 5c is located on the side surface 3c. An existence ratio of the gaps 13 in the second electrode layer E2 included in the electrode portion 5e is larger than an existence ratio of the gaps 13 in the second electrode layer E2 included in the electrode portion 5c. The existence ratio of the gaps 13 is a ratio of the total area of the gaps 13 to the area of the second electrode layer E2 in a cross-section along the thickness direction of the second electrode layer E2. In the present embodiment, the thickness direction of the second electrode layer E2 coincides with a direction orthogonal to the end surface 3e in the second electrode layer E2 included in the electrode portion 5e, and coincides with a direction orthogonal to the side surface 3c in the second electrode layer E2 included in the electrode portion 5c. That is, the thickness direction of the second electrode layer E2 coincides with the third direction D3 in the second electrode layer E2 included in the electrode portion 5e, and coincides with the second direction D2 in the second electrode layer E2 included in the electrode portion 5c. For example, in a case in which the portion included in the electrode portion 5e constitutes a first portion, the portion included in the electrode portion 5c constitutes a second portion.

The existence ratio of the gaps 13 in the second electrode layer E2 included in the electrode portion 5e is, for example, a value expressed as a percentage and obtained by dividing the total area of the gaps 13 existing in the second electrode layer E2 of the electrode portion 5e by the area of the second electrode layer E2 of the electrode portion 5e in the cross-section along the thickness direction of the second electrode layer E2. The existence ratio of the gaps 13 in the second electrode layer E2 included in the electrode portion 5e is in the range of 5 to 35%. In the present embodiment, the total area of the gaps 13 existing in the second electrode layer E2 of the electrode portion 5e is 1000 to 70000 μm². The area of the second electrode layer E2 included in the electrode portion 5e is 0.020 to 0.200 mm². For example, the total area of the gaps. 13 existing in the second electrode layer E2 of the electrode portion 5e is 20000 μm², and the area of the second electrode layer E2 of the electrode portion 5e is 0.100 mm². In this case, the existence ratio of the gaps 13 in the second electrode layer E2 included in the electrode portion 5e is 20%. The area of the second electrode layer E2 included in the electrode portion 5e is the area of a region defined by the surface of the first electrode layer E1 and the surface of the second electrode layer E2 in the electrode portion 5e. The area of the second electrode layer E2 included in the electrode portion 5e includes the total area of the gaps 13 existing in the second electrode layer E2 included in the electrode portion 5e.

The existence ratio of the gaps 13 in the second electrode layer E2 included in the electrode portion 5c is, for example, a value expressed as a percentage and obtained by dividing the total area of the gaps 13 existing in the second electrode layer E2 of the electrode portion 5c by the area of the second electrode layer E2 of the electrode portion 5c in the cross-section along the thickness direction of the second electrode layer E2. The existence ratio of the gaps 13 in the second electrode layer E2 included in the electrode portion 5c is in the range of 5 to 35%. In the present embodiment, the total area of the gaps 13 existing in the second electrode layer E2 included in the electrode portion 5c is 400 to 17500 μm². The area of the second electrode layer E2 included in the electrode portion 5c is 0.008 to 0.050 mm². For example, the total area of the gaps 13 existing in the second electrode layer E2 of the electrode portion 5c is 2800 μm², and the area of the second electrode layer E2 of the electrode portion 5c is 0.028 mm². In this case, the existence ratio of the gaps 13 in the second electrode layer E2 included in the electrode portion 5c is 10%. The area of the second electrode layer E2 included in the electrode portion 5c is the area of a region defined by the surface of the first electrode layer E1 and the surface of the second electrode layer E2 in the electrode portion 5c. The area of the second electrode layer E2 included in the electrode portion 5c includes the total area of the gaps 13 existing in the second electrode layer E2 included in the electrode portion 5c.

The maximum length of the gap 13 can be obtained, for example, as follows.

A cross-sectional photograph of the external electrode 5 (for example, electrode portion 5e) is acquired. The cross-sectional photograph is, for example, a photograph obtained by capturing a cross-section when the electrode portion 5e is cut along a plane orthogonal to the end surface 3e. The cross-sectional photograph is, for example, a photograph obtained by capturing a cross-section of the electrode portion 5e when cut along a plane that is parallel to a pair of surfaces opposing each other (for example, the pair of side surfaces 3c) and equidistant from the pair of surfaces. The acquired cross-sectional photograph is subjected to image processing by software to determine boundaries of the gaps 13 and obtain the maximum length of the gap 13. The maximum lengths of the plurality of gaps 13 may be obtained, and an average value of the maximum lengths of the plurality of gaps 13 may be obtained. In this case, the average value is set as the maximum length of the gap 13.

The total area of the gap 13 can be obtained, for example, as follows.

A cross-sectional photograph of the external electrode 5 (the electrode portion 5e and the electrode portion 5c) is acquired. The cross-sectional photograph is, for example, a photograph obtained by capturing a cross-section when the external electrode 5 is cut along a plane orthogonal to the end surface 3e and the side surface 3c. The cross-sectional photograph is, for example, a photograph obtained by capturing the cross-section of the external electrode 5 when cut along a plane parallel to the pair of main surfaces 3a and 3b and equidistant from the pair of main surfaces 3a and 3b. The acquired cross-sectional photograph is subjected to image processing by software, boundaries of the gaps 13 are determined, and the total area of the gaps 13 existing in the second electrode layer E2 included in the electrode portion 5e and the total area of the gaps 13 existing in the second electrode layer E2 included in the electrode portion 5c are obtained.

The area of the second electrode layer E2 can be determined, for example, as follows.

A cross-sectional photograph of the external electrode 5 (the electrode portion 5e and the electrode portion 5c) is acquired. As described above, the cross-sectional photograph is the photograph obtained by capturing the cross-section when the external electrode 5 is cut along the plane orthogonal to the end surface 3e and the side surface 3c. The acquired cross-sectional photograph is subjected to image processing by software, a surface of the first electrode layer E1 and a surface of the second electrode layer E2 are determined, and the area of the second electrode layer E2 included in the electrode portion Se and the area of the second electrode layer E2 included in the electrode portion 5c are obtained. The surface of the first electrode layer E1 is a boundary between the first electrode layer E1 and the second electrode layer E2. The surface of the second electrode layer E2 is a boundary between the second electrode layer E2 and the third electrode layer E3.

As illustrated in FIGS. 6 and 7, a plurality of openings 15 is formed in the third electrode layer E3. Some openings 15 of the plurality of openings 15 overlap with openings of the passage constituted by the gaps 13 communicating with each other, the openings of the passage being located at the surface of the second electrode layer E2. The opening 15 overlaps with a part or the whole of the opening of the passage constituted by the gaps 13 communicating with each other. Therefore, the opening 15 communicates with an inside of the second electrode layer E2 through the passage constituted by the gaps 13 communicating with each other.

At a position of the opening 15, the second electrode layer E2 is exposed from the third electrode layer E3. As illustrated in FIG. 6, some openings 15 of the openings 15 are covered with the fourth electrode layer E4. In a case in which the opening 15 is covered with the fourth electrode layer E4, the fourth electrode layer E4 is formed on the second electrode layer E2 at the position of the opening 15. In this case, the second electrode layer E2 is in contact with the fourth electrode layer E4 at the position of the opening 15. As illustrated in FIG. 7, in a case in which the opening 15 is not covered with the fourth electrode layer E4, the second electrode layer E2 is exposed from the fourth electrode layer E4 at the position of the opening 15. In this case, the second electrode layer E2 is exposed from the plating layer disposed on the second electrode layer E2 at the position of the opening 15. The second electrode layer E2 includes a region in contact with the third electrode layer E3, a region in contact with the fourth electrode layer E4, and a region not in contact with the plating layers (the third electrode layer E3 and the fourth electrode layer E4).

The inner diameter of the opening 15 is 1 to 40 μm. For example, the inner diameter of the opening 15 is 10 μm. The number of the openings 15 per 1 mm$^2$ is 0.1 to 10.

The inner diameter of the opening 15 can be obtained, for example, as follows.

A cross-sectional photograph of the external electrode 5 (for example, electrode portion 5e) is acquired. The cross-sectional photograph is a photograph obtained by capturing a cross-section of the electrode portion 5e when the electrode portion 5e is cut along a plane orthogonal to the end surface 3e. The cross-sectional photograph is, for example, a photograph obtained by capturing a cross-section of the electrode portion 5e when cut along a plane that is parallel to a pair of surfaces opposing each other (for example, the pair of principal surfaces 3a and 3b) and equidistant from the pair of surfaces. The acquired cross-sectional photograph is subjected to image processing by software to determine a boundary of the opening 15 and obtain a length of the opening 15. This length is defined as the inner diameter of the opening 15. Lengths of the plurality of openings 15 may be obtained, and an average value of the lengths of the plurality of openings 15 may be obtained. In this case, the average value is set as the inner diameter of the opening 15.

The number of the openings 15 can be determined, for example, as follows.

A photograph of the surface of the external electrode 5 (electrode portion Se) is acquired. The number of openings 15 existing in an arbitrary range of a 1 mm square range on the acquired photograph is obtained. In a case in which the opening 15 is covered with the fourth electrode layer E4, a depression is formed in the fourth electrode layer E4 at the position of the opening 15 as illustrated in FIG. 6. Therefore, the position of the opening 15 is specified even in a case in which the opening 15 is covered with the fourth electrode layer E4.

As described above, the external electrode 5 includes the fourth electrode layer E4 in the present embodiment. Therefore, the multilayer capacitor C1 can be solder-mounted on the electronic device. The third electrode layer E3 suppresses the occurrence of solder leaching when the multilayer capacitor C1 is solder-mounted.

When the multilayer capacitor C1 is solder-mounted, the fourth electrode layer E4 melts into the solder. Even in a case in which moisture absorbed in the resin in the second electrode layer E2 is gasified during solder-mounting, the gas generated from the moisture moves out of the external electrode 5 through the opening 15 from the second electrode layer E2. Therefore, stress tends not to act on the second electrode layer E2. Consequently, the multilayer capacitor C1 suppresses peel-off of the second electrode layer E2.

In the multilayer capacitor C1, the inner diameter of the opening 15 is 1 to 40 μm.

In a case in which the inner diameter of the opening 15 is shorter than 1 μm, the gas generated from the moisture tends not to move inside the opening 15. In a case in which the inner diameter of the opening 15 is longer than 40 μm, a region where the second electrode layer E2 is exposed from the third electrode layer E3 tends to increase. The increase of the region where the second electrode layer E2 is exposed from the third electrode layer E3 tends not to suppress the occurrence of solder leaching. Therefore, the multilayer capacitor C1 reliably suppresses the occurrence of solder leaching, and suppresses the inhibition of gas movement through the opening 15.

In the multilayer capacitor C1, the number of the openings 15 per 1 mm$^2$ is 0.1 to 10.

In a case in which the number of the openings 15 per 1 mm$^2$ is smaller than 0.1, the gas generated from the moisture tends not to move out of the external electrode 5. In a case in which the number of the openings per 1 mm$^2$ is larger than 10, the region where the second electrode layer E2 is exposed from the third electrode layer E3 tends to increase. The increase of the region where the second electrode layer E2 is exposed from the third electrode layer E3 tends not to suppress the occurrence of solder leaching. Therefore, the multilayer capacitor C1 reliably suppresses the occurrence of solder leaching, and suppresses the inhibition of the gas movement out of the external electrode 5.

In the multilayer capacitor C1, the opening 15 communicates with the inside of the second electrode layer E2.

Therefore, the gas generated from moisture in the second electrode layer E2 moves efficiently out of the external electrode 5. Consequently, the stress further tends not to act on the second electrode layer E2 in the multilayer capacitor C1.

In the multilayer capacitor C1, the opening 15 communicates with the plurality of gaps 13 existing in the second electrode layer E2. Therefore, the gas generated from the moisture in the second electrode layer E2 moves more efficiently out of the external electrode 5.

In the multilayer capacitor C1, the existence ratio of the gaps 13 in the second electrode layer E2 included in the electrode portion 5e is larger than the existence ratio of the gaps 13 in the second electrode layer E2 included in the electrode portion 5c.

In a case in which the gas generated from the moisture in the second electrode layer E2 moves out of the external electrode 5 through the opening 15 formed in the third electrode layer E3 included in the electrode portion 5c, a posture of the multilayer capacitor C1 tends to change during solder-mounting due to ejection of the gas from the electrode portion 5c. In a case in which the posture of the multilayer capacitor C1 changes, a mounting failure of the multilayer capacitor C1 may occur.

In a case in which the existence ratio of the gap 13 in the second electrode layer E2 included in the electrode portion 5e is larger than the existence ratio of the gap 13 in the second electrode layer E2 included in the electrode portion 5c, the gas generated from the moisture in the second electrode layer E2 tends to moves out of the external electrode 5 through the opening 15 formed in the third electrode layer E3 included in the electrode portion 5e. That is, the gas tends not to moves from the opening 15 formed in the third electrode layer E3 included in the electrode portion 5c. Therefore, the gas moves mainly through the opening 15 formed in the third electrode layer E3 included in the electrode portion 5e in the multilayer capacitor C1. Consequently, the multilayer capacitor C1 suppresses the occurrence of the mounting failure.

In the multilayer capacitor C1, the second electrode layer E2 includes the region not in contact with the plating layers (the third electrode layer E3 and the fourth electrode layer E4). That is, the second electrode layer E2 includes a region exposed to the opening 15. In a case in which the second electrode layer E2 is exposed to the opening 15, even in a case in which the moisture absorbed in the resin is gasified during solder-mounting, the gas generated from the moisture moves from the second electrode layer E2 out of the external electrode 5 through the opening 15, the stress tends not to act on the second electrode layer E2. Consequently, the multilayer capacitor C1 suppresses peel-off of the second electrode layer E2.

In the multilayer capacitor C1, some openings 15 among the openings 15 are covered with the fourth electrode layer E4. Therefore, in the multilayer capacitor C1, the moisture tends not to enter the external electrode 5 and solder leaching tends not to occur, as compared with a configuration in which all the openings 15 are not covered with the fourth electrode layer E4. In a case in which all the openings 15 are covered with the fourth electrode layer E4, the moisture further tends not to enter the external electrode 5, and solder leaching further tends not to occur.

In the present specification, in a case in which an element is described as being disposed on another element, the element may be directly disposed on the other element or be indirectly disposed on the other element. In a case in which an element is indirectly disposed on another element, an intervening element is present between the element and the other element. In a case in which an element is directly disposed on another element, no intervening element is present between the element and the other element.

In the present specification, in a case in which an element is described as covering another element, the element may directly cover the other element or indirectly cover the other element. In a case in which an element indirectly covers another element, an intervening element is present between the element and the other element. In a case in which an element directly covers another element, no intervening element is present between the element and the other element.

In the present specification, in a case in which an element is described as being located on another element, the element may be directly located on the other element or be indirectly located on the other element. In a case in which an element is indirectly located on another element, an intervening element is present between the element and the other element. In a case in which an element is directly located on another element, no intervening element is present between the element and the other element.

Although the embodiment of the present invention have been described above, the present invention is not necessarily limited to the embodiment, and the embodiment can be variously changed without departing from the scope of the invention.

The inner diameter of the opening 15 is not necessarily in the range of 1 to 40 μm. In a case in which the inner diameter of the opening 15 is in the range of 1 to 40 μm, the multilayer capacitor C1 reliably suppresses the occurrence of solder leaching and suppresses the inhibition of gas movement through the opening 15 as described above.

The number of the openings 15 per 1 $mm^2$ is not necessarily in the range of 0.1 to 10. In a case in which the number of the openings 15 per 1 $mm^2$ is within the range of 0.1 to 10, the multilayer capacitor C1 reliably suppresses the occurrence of solder leaching, and suppresses the inhibition of the gas movement out of the external electrode 5 as described above.

The opening 15 does not necessarily communicate with the inside of the second electrode layer E2. In a case in which the opening 15 communicates with the inside of the second electrode layer E2, the gas generated from the moisture in the second electrode layer E2 moves efficiently out of the external electrode 5, the stress further tends not to act on the second electrode layer E2 as described above.

The plurality of gaps 13 does not necessarily exist in the second electrode layer E2. In a case in which the plurality of gaps 13 exists in the second electrode layer E2, the gas generated from the moisture in the second electrode layer E2 more efficiently moves out of the external electrode 5 as described above.

The existence ratio of the gaps 13 in the second electrode layer E2 included in the electrode portion 5e may be equal to or smaller than the existence ratio of the gaps 13 in the second electrode layer E2 included in the electrode portion 5c. In a case in which the existence ratio of the gaps 13 in the second electrode layer E2 included in the electrode portion 5e is larger than the existence ratio of the gaps 13 in the second electrode layer E2 included in the electrode portion 5c, the multilayer capacitor C1 suppresses the occurrence of the mounting failure as described above.

The electronic component of the present embodiment is the multilayer capacitor C1. Applicable electronic component is not limited to the multilayer capacitor. Examples of the applicable electronic components include, but not limited to, multilayer electronic components such as a multilayer inductor, a multilayer varistor, a multilayer piezoelectric actuator, a multilayer thermistor, or a multilayer composite component, and electronic components other than the multilayer electronic components.

What is claimed is:

1. An electronic component comprising:
an element body; and
an external electrode disposed on the element body, the external electrode including:
 a conductive resin layer;
 a solder plating layer arranged to constitute an outermost layer of the external electrode;
 an intermediate plating layer disposed between the conductive resin layer and the solder plating layer, the intermediate plating layer having electrical conductivity and better solder leach resistance than metal contained in the conductive resin layer; and
 an opening disposed in the intermediate plating layer, the solder plating layer being disposed on the conductive resin layer through the opening.

2. The electronic component according to claim 1, wherein
an inner diameter of the opening is 1 to 40 μm.

3. The electronic component according to claim 1, wherein
the number of a plurality of the openings per 1 mm$^2$ is 0.1 to 10.

4. The electronic component according to claim 1, wherein
the opening communicates with an inside of the conductive resin layer.

5. The electronic component according to claim 4, wherein
the opening communicates with a plurality of gaps existing in the conductive resin layer.

6. The electronic component according to claim 5, wherein
the element body has a rectangular parallelepiped shape, and includes a pair of end surfaces opposing each other in a longitudinal direction of the element body and a side surface adjacent to the pair of end surfaces,
the conductive resin layer includes a first portion located on the end surface and a second portion located on the side surface, and
an existence ratio of the gaps in the first portion is larger than an existence ratio of the gaps in the second portion.

7. An electronic component comprising:
an element body; and
an external electrode on the element body, the external electrode including:
 a conductive resin layer;
 a plating layer (1) on the conductive resin layer, (2) having electrical conductivity, and (3) having an opening, wherein:
a region of the conductive resin layer is exposed to the exterior of the external electrode through the opening, and
the external electrode has an outermost surface that includes a surface of the plating layer and a surface of the region.

8. The electronic component according to claim 7, wherein:
the element body includes a principal surface configured to be a mounting surface and an end surface adjacent and orthogonal to the principal surface; and
the opening is at the end surface.

9. The electronic component according to claim 7, wherein:
the element body includes a principal surface configured to be a mounting surface and an end surface adjacent and orthogonal to the principal surface;
the external electrode includes an electrode portion on the end surface; and
the electrode portion includes a portion of the plating layer having the opening.

* * * * *